US00RE36838E

United States Patent [19]

Sugawara et al.

[11] E Patent Number: Re. 36,838

[45] Reissued Date of Patent: Aug. 29, 2000

[54] GLASS BULB FOR A CATHODE RAY AND A METHOD OF PRODUCING THE SAME

[75] Inventors: Tsunehiko Sugawara, Osaka; Naoki Morihiro, Funabashi; Toshikazu Ikezawa, Funabashi; Toshihide Murakami, Funabashi; Yusuke Kobayashi, Osaka, all of Japan

[73] Assignee: Asahi Glass Company Ltd., Tokyo, Japan

[21] Appl. No.: 09/289,648

[22] Filed: Apr. 12, 1999

Related U.S. Patent Documents

Reissue of:

[64] Patent No.: 5,536,995
Issued: Jul. 16, 1996
Appl. No.: 08/341,918
Filed: Nov. 16, 1994

[30] Foreign Application Priority Data

Nov. 16, 1993 [JP] Japan ..... 5-286841
Nov. 17, 1993 [JP] Japan ..... 5-288189

[51] Int. Cl.[7] ..... H01J 29/86

[52] U.S. Cl. ..... 313/477 R; 220/2.1 A

[58] Field of Search ..... 313/477 R, 479, 313/461, 473; 220/2.1 R, 2.3 A, 2.1 A

[56] References Cited

U.S. PATENT DOCUMENTS 2,991,591 7/1961 Gabor et al. .
4,566,893 1/1986 Hopkins .
5,357,165 10/1994 Shibaoka et al. ..... 313/477 R
5,445,285 8/1995 Sugawara et al. ..... 313/477 R

FOREIGN PATENT DOCUMENTS 57-208042 12/1982 Japan .
61-185849 8/1986 Japan .
2-126540 5/1990 Japan .

OTHER PUBLICATIONS

"Physical Chemistry of Glass Surfaces", Shoji Tsuchibashi, (Mar. 3, 1980), published by Kodansha, pp. 253–260.
"Glass Encyclopedia" edited by Sumino Sakuhana, Sep. 20, 1985, published by Asakura Shoten Co., Ltd., pp. 302–309.
"Glass Technology," vol. 19, No. 3, Jun. 1978, pp. 57–58.
"RCA Engineering," vol. 29, No. 5, Sep.–Oct. 1984, pp. 56–62.

*Primary Examiner*—Vip Patel
*Attorney, Agent, or Firm*—Oblon, Spivak, McClelland, Maier & Neustadt, P.C.

[57] ABSTRACT

A glass panel 3 for a glass tube for a cathode ray tube has a flat panel face portion 7 and a reduced thickness while maintaining a sufficient strength without increasing a difference of brightness, and with less shrinking deformation due to the cooling and solidification of the glass panel.

Compressive stress layers 20, 21 having a thickness of $t_o/10$ or more are formed in outer and inner surfaces of the face portion 7 of the glass panel 3 respectively. The relation to the wall thickness $t_d$ of the central portion of the face portion to the wall thickness $t_o$ of a portion near an edge portion on a diagonal line is $1.0 \leqq t_d/t_o \leqq 1.2$. Compressive stress layers 22, 23 are formed in outer and inner surfaces of a skirt portion 6 wherein the compressive stress value of the face portion 7 is larger than the compressive stress value of the skirt portion, and the compressive stress value of the outer surface 20 of the face portion is larger than that of the inner surface 21.

24 Claims, 2 Drawing Sheets

GLASS BULB FOR A CATHODE RAY AND A METHOD OF PRODUCING THE SAME

Matter enclosed in heavy brackets [ ] appears in the original patent but forms no part of this reissue specification; matter printed in italics indicates the additions made by reissue.

BACKGROUND OF THE INVENTION

FIELD OF THE INVENTION

The present invention relates to a glass bulb for a cathode ray tube (a Braun tube) used for TVs and a method of producing the same. More particularly, the present invention concerns the structure of a glass panel constituting the display surface of the glass bulb and method of producing the glass panel.

DISCUSSION OF BACKGROUND

FIG. 3 shows the construction of a cathode ray tube used for a TV or the like. The cathode ray tube 1 comprises a glass bulb 2 which is basically constituted by a glass panel portion 3 constituting a picture displaying surface, a funnel portion 4 in a funnel-like form which is airtightly joined to the glass panel portion 3 and a neck portion 5 in which an electron gun 17 is installed. The glass panel 3 comprises a substantially rectangular face portion 7 for constituting a picture displaying surface and a skirt portion 6 extending from the circumferential portion of the face portion 7 in substantially perpendicular to the face portion 7.

An implosion-proof reinforcing band 8 is wound around outer periphery of the skirt portion 6 in order to maintain the strength of the glass panel 3 and prevent glass pieces from scattering when glass panel is broken. Inside the face portion 7, a fluorescent film 12 for emitting fluorescence when electron beams from the electron gun 17 are bombarded and an aluminum film 13 for reflecting light emitted from the fluorescent film 12 toward the front of the cathode ray tube are laminated. Further, a shadow mask 14 for defining the position of irradiation of the electron beams is provided on the inner surface of the laminate. The shadow mask 14 is fixed to the inner surface of the skirt portion 6 by means of a stud pin 15.

The glass panel 3 is airtightly joined to the funnel portion 4 with aid of a sealing agent such as solder glass applied to a sealing portion 10. Inside the funnel portion 4, an inner coating 16 is applied so as to prevent the shadow mask 14 from being charged with electric charges by the electron beams and to provide an earthing means.

Since the glass bulb for a cathode ray tube having the construction described above is used as a vacuum container, an atmospheric pressure acts on the outer surface of the glass bulb to produce a stress. Since the glass bulb has an asymmetric structure different from a spherical shape, there is a region of tensile stress in a relatively large areas as well as a region of compressive stress. Accordingly, if a mechanical shock is applied to the glass bulb and a crack or breakage is resulted in a local portion, the local crack or the local breakage is instantaneously developed to release a stored strain energy; thus, implosion is resulted.

In order to prevent such danger of implosion, there has been proposed to attach a metallic reinforcing band 8 to the skirt portion 6 of the glass panel 3, or to form the glass bulb to have a structure similar to a spherical shape to thereby reduce the radius of curvature of the glass panel (for instance, it has about 1R where 1R is 42.5×V/25.4+45.0 and V represents the length of a diagonal line of effective displaying surface in a unit of mm). Thus, the strength of the glass panel 3 to a shock was assured. Further, there has been practiced a method of increasing the strength by increasing the wall thickness of the face portion of the glass panel.

Further, in order to increase the mechanical strength of the glass bulb for a cathode ray tube to a shock or the like, there has been used a physically strengthening method that after the glass panel has been shaped, it is cooled to cause shrinkage whereby a compressive stress layer is formed in the front surface.

In the physically strengthening method, when a glass bulb is rapidly cooled from a temperature region near the glass softening point, the surface of glass is rapidly shrinked and solidified. However, the inside of the glass is in a state having a sufficient fluidity and expansion, and a temporal distortion is instantaneously released by the fluidity. When the glass bulb is further cooled, the inside of the glass tends to shrink. However, the movement of shrinkage is limited by the solidified surface layer. As a result, when the temperature of the glass decreases to the room temperature to reach a sufficient equilibrium state, a layer having a large compressive stress is formed in surface portions of the glass and a layer having a large tensile stress is formed inside the glass as residual stresses. In this case, the magnitude of the stresses produced in the glass depends on a time required when the temperature at the surface of the glass decreases from a slow cooling point to the distortion point. As the cooling time is short, a large difference of shrinkage between the surface portion and the inside of the glass is obtained, and a large compressive stress is produced in the surface portion after the cooling. Accordingly, in case of strengthening a substantially rectangular glass panel having a face portion and a skirt portion, a desired distribution of stresses can be obtained by adjusting the cooling rate for each section.

A glass panel for a color picture tube is prepared as follows. A molten glass mass heated to about 1000° C.–1100° C. is put in a mold, a press die is operated to press-shape the mass, and a stud pin is attached to an inner wall portion of the skirt portion. At the later stage, the glass panel reaches near the annealing point. Then, the beforementioned physically strengthening can be obtained by suitably conducting cooling operations until the temperature reaches the distortion point. In the conventional technique, when the glass panel is cooled, the skirt portion is cooled and solidified faster than the face portion. Accordingly, the value of compressive stress formed in the skirt portion is about 1.5 to 3 times as large as the value of compressive stress of the face portion as disclosed in U.S. Pat. No. 4,566,893, for instance.

In the conventional glass bulb for a cathode ray tube, when the radius of curvature of the glass panel is made small in order to increase the strength of the panel to a shock, visibility becomes poor and pictures are unclear. For this purpose, there is a requirement of making the face portion flat. For instance, the face portion should have the radius of curvature of about 1.5 R–2R so as to form the picture surface to be flat for easy watching. However, there arises a problem that when the face portion is made flat, it becomes weak to a mechanical shock.

Further, when the reinforcing band is attached to the glass panel, an uneven fastening force is applied to the skirt portion which is joined to the peripheral edge of the face portion, and stable and highly reliable implosion-proof properties can not be obtained with the result that the purpose of reinforcing of the face portion can not be sufficiently achieved.

On the other hand, when the entirety of the face portion is made thick to obtain sufficient reinforcement, the weight of the face portion is increased, and handling properties becomes worse. In order to improve this point, there is used such a structure that the outer surface of the face portion is made flat; the radius of curvature of the inner surface is made small, and the wall thickness at peripheral portions of the face portion, in particular, four corner portions is increased. Although such structure reduces the weight of the glass panel, there arises a problem that the light transmittance at the central portion of the face portion differs from that at a peripheral portion of the face portion due to the difference of thickness, and difference in brightness in picture image becomes large to thereby decrease the quality of display.

Brightness B is expressed by $B=\rho T_m T_p V^a I^b/S$ where ρ is luminous efficacy of a fluorescent material, $T_m$ is the transmittance of a mask, Tp is the transmittance of the glass panel, V is an anode voltage, I is a beam current, S is the surface area of a screen and characters a and b are constants.

Further, the transmittance T of the glass panel is expressed by $T=(1-R)^2\cdot\exp(-k\cdot t)$ where R is the reflectance of glass (4–4.5%), k is an absorptivity coefficient and t is the wall thickness of glass.

The transmittance and the absorptivity coefficient of two kinds of glass panel material manufactured by Asahi Glass Company Ltd. are shown in table 1.

TABLE 1

| Panel glass | Transmittance (10.16 mm) | Absorpitivity coefficient ($mm^{-1}$) |
|---|---|---|
| 5001 | 57.0% | 0.046263 |
| 5001D | 46.0% | 0.067366 |

Table 2 shows the wall thickness at the central portion and a peripheral portion of the face portion, and the ratio thereof and, the flatness, the transmittance and the ratio of transmittance, of glass panels of various sizes, which are formed with the same glass material.

TABLE 2

| | | Glass wall thickness (mm) | | | Transmittance (%) | | |
|---|---|---|---|---|---|---|---|
| Size | Flatness | $t_o$ | $t_d$ | $t_d/t_o$ | To | Td | Td/To |
| 36(16:9) | 1.8R | 17.0 | 20.6 | 1.21 | 413 | 35.2 | 54.7 |
| 32(16:9) | 1.9R | 14.8 | 18.3 | 1.24 | 46.0 | 39.1 | 85.1 |
| 29B | 1.3R | 12.5 | 15.6 | 1.25 | 51.1 | 44.3 | 86.6 |
| 29L | 2.0R | 13.7 | 16.1 | 1.18 | 48.4 | 43.3 | 89.5 |
| 28(16:9) | 2.0R | 14.5 | 17.4 | 1.20 | 46.6 | 40.8 | 87.4 |
| 26 | 1.3R | 12.5 | 14.6 | 1.17 | 51.2 | 46.4 | 90.7 |
| 24(16:9) | 1.9R | 12.5 | 15.2 | 1.25 | 51.2 | 45.1 | 88.3 |
| 21J | 1.6R | 12.5 | 13.8 | 1.10 | 51.2 | 48.2 | 94.1 |
| 21M | 1.0R | 12.5 | 14.4 | 1.15 | 51.2 | 46.8 | 91.6 |
| 15A | 1.7R | 10.0 | 12.7 | 1.27 | 57.4 | 50.7 | 88.2 |
| 15T | 1.9R | 10.0 | 13.9 | 1.39 | 57.4 | 47.9 | 83.4 |

Numerals in brackets in the column of the size in Table 2 indicate the aspect ratio of picture screens and items without bracket indicate that the aspect ratio of the picture screen is 4:3. As understood from Table 2, when the flatness is changed depending on the size, the wall thickness of the glass panel at its peripheral portion is changed, and accordingly, the transmittance is changed. Accordingly, if the difference of transmittance between the central portion and an edge portion of the face portion is reduced, the ratio of transmittance approaches 100%, and the distribution of brightness can be uniform.

However, when the wall thickness is made uniform while the face portion is formed to be flat, the implosion-proof properties are decreased, and the glass panel portion is apt to be broken by a slight impact. When the wall thickness is increased to increase the strength, the weight is increased and handling properties are decreased. In order to reduce the weight, when the radius of curvature of the front surface of the face portion is reduced so that the central portion of the face portion is formed to be thin while the end portions are formed to be thick, there arises problems that there is a large difference of brightness between the central portion and the end portions of the face portion and visibility decreases.

In the physically strengthening method with use of the conventional cooling method wherein the skirt portion is cooled faster than the face portion, the face portion having a temperature region where a viscous flow is apt to occur, suffers a large deformation according to the movement of the shrinking skirt portion when the glass panel is cooled and solidified. This reduces the accuracy of the radius of curvature in the inner wall of the face portion, and the face portion becomes unstable. When a color TV with such glass panel is used, there may cause a fault in electron beam landing characteristics and a stable colored picture can not be obtained.

SUMMARY OF THE INVENTION

It is an object of the present invention to provide a glass bulb of a cathode ray tube and a method of producing the same wherein the outer surface of the face portion is flat; the wall thickness of the entire portion of the glass panel is reduced and the strength to a mechanical shock is improved without causing a large difference of brightness between the central portion and a peripheral portion of the face portion.

It is another object of the present invention to provide a glass bulb for a cathode ray tube and a method of producing the same wherein a deformation of the face portion due to shrinkage as a result of cooling and solidification of the skirt portion of the glass panel, is minimized.

In accordance with the present invention, there is provided a glass bulb for a cathode ray tube which comprises:

a glass panel portion having a substantially rectangular face portion constituting a picture displaying surface and a skirt portion contiguous to the circumferential portion of the face portion and extending therefrom in substantially perpendicular to the face portion, a funnel portion is a funnel-like form which is airtightly connected to the glass panel portion, and a neck portion disposed at the root of the funnel portion and containing therein an electron gun, wherein compressive stress layers each having a thickness of $t_o/10$ or more are formed in the outer surface and the inner surface of the face portion where $t_o$ is the wall thickness at the central portion of the effective picture surface portion of the face portion of the glass panel portion.

In the above-mentioned invention, it is preferable that the glass wall thickness $t_d$ near an edge portion of the face portion and on a diagonal line of the face portion is in a relation of $1.0 \leqq t_d/t_o \leqq 1.2$.

Further in a region including the diagonal line of effective picture surface portion of the face portion, there should be $60\ kg/cm^2 < |\rho_c|$ where $\rho_c$ is the stress value of the compress stress layers.

The glass wall thickness $t_d$ near an edge portion of the face portion means the wall thickness of an end portion of the effective picture surface of the face portion. The edge portion of the effective picture surface of the face portion is the contacting portion between the curved inner surface of the panel face and the blend R (a circle formed by contact between the curved inner surface and the skirt portion).

It is preferable that a radius of curvature $R_G$ of the outer surface of the face portion is 1.5R or more where R=42.5×V/25.4+45.0 (mm) and V is the length of a diagonal line of effective displaying surface. The radius of curvature $R_G$ of 1.5R or more renders the picture surface to be flat and provides easy watching.

It is desirable that the compressive stress layers in the outer and inner surfaces of the face portion are substantially uniformly formed in the entire of the face portion. The uniformly formed compressive stress layers uniformly strengthen the panel face portion and prevent the surface accuracy of the face portion from deterioration.

It is preferable that the compressive stress layers are extended to the skirt portion of the glass panel portion in order to strengthen the entirety of the glass panel portion. In this case, the stress value (absolute value) of the compressive stress layers of the face portion should be larger than the stress value (absolute value) of the compressive stress layers of the skirt portion since deformation or twisting of the panel face portion can be minimized. Further, in order to prevent the deformation of the panel face portion, the stress value of the compressive stress layer in the outer surface of the face portion should be equal to or larger than the stress value of that in the inner surface.

In the above-mentioned invention, the compressive stress layers are formed by a cooling treatment after the glass panel has been press-shaped.

As the second invention, there is provided a method of producing a glass bulb for a cathode ray tube which comprises:

press-shaping a glass panel portion of a glass bulb for a cathode ray tube, holding the press-shaped glass panel portion directing the outer surface of the face portion downwardly in an annealing device, and supplying a cooling air to the glass panel portion from its lower side.

In the second invention, it is preferable that the cooling air is supplied to the glass panel portion at a cooling rate of 15° C./min.–200° C./min. for the glass panel portion from a temperature region where the glass viscosity is $10^{14}$ poises or lower (i.e. about 470° C.–500° C.) to a temperature region where the glass viscosity is $10^{16}$ poises or higher (i.e. about 400° C.–430° C.).

In determination of the temperature of the glass panel portion in the annealing device, the temperature range where the glass viscosity is $10^{14}$ poises or lower should be the highest. When the temperature of the glass panel portion is lower than the temperature range where the glass viscosity is $10^{14}$ poises or lower, the formation of compressive stress layer in the glass surface is insufficient. Namely, in a case that the glass panel portion is heated again in the annealing device to bring the temperature to the temperature range where the glass viscosity $10^{14}$ poises or lower, a residual stress produced during the previous strep once disappears. Therefore, a sufficient compressive stress can be formed in a cooling step which is then conducted. On the other hand, in the temperature range where the glass viscosity is $10^{16}$ poises or higher, the solidification of glass substantially completes. Accordingly, it is unnecessary to forcibly cool the glass by supplying the cooling air. When the cooling rate to the glass panel portion with the cooling air is smaller than 15° C./min, the formation of compressive stress is insufficient. On the other hand, when it is higher than 200° C./min, a large tensile stress is resulted in the surface portion in the cooling step, and the glass is apt to break.

Accordingly, it is preferable that the temperature of cooling air is in a range of 100° C.–400° C. When the temperature is less than 100° C., the glass is excessively cooled, so that it is easily broken. When the temperature is higher than 400° C., the glass can not sufficiently be cooled, so that the formation of compressive stress is insufficient.

As the alternative of the second invention, the temperature of the glass panel portion may be brought to the temperature range where the glass viscosity is $10^{14}$ poises or lower when it is put into the annealing device; then, the glass panel portion is cooled by supplying cooling air to bring the temperature to the temperature region where the glass viscosity is $10^{16}$ poises or higher in the annealing device, and thereafter, it is left for cooling to the room temperature at a cooling rate of about 10° C./min or lower. In this case, it is unnecessary to heat again the glass panel portion in the annealing device. Since it is possible to continuously cool the glass panel portion after the press-shaping, there are advantages of shortening a manufacturing time and miniaturization of the annealing device.

As the third invention, there is provided a method of producing a glass bulb for a cathode ray tube which comprises:

press-shaping a glass panel portion of a glass bulb for a cathode ray tube, cooling a face portion of the glass panel portion at a cooling rate of 50° C./min or higher from the glass softening point to a temperature region where the glass viscosity is $10^{17}$ poises or higher (i.e. less than 400° C.), putting the glass panel portion in an annealing device to raise temperature to the extent that the glass viscosity is in a range of $10^{13.5}$–$10^{15}$ poises (i.e. about 450° C.–500° C.), and cooling the glass panel portion to the room temperature.

In the third invention, when the glass panel portion is cooled from the temperature range where the glass viscosity is in a range of $10^{13.5}$–$10^{15}$ poises to the room temperature, it should be cooled at a cooling rate of 10° C./min or lower. When the cooling rate is higher than 10° C./min, an undesirable compression stress is formed in the glass surface.

It is preferable that the temperature of the skirt portion of the glass panel portion is maintained to be higher than the temperature of the face portion until the temperature is raised to a temperature range where the glass viscosity of the face portion is $10^{13.5}$–$10^{15}$ poises after the glass panel portion has been put in the annealing device. By maintaining the temperature of the skirt portion to be higher than the temperature of the face portion, a compressive stress having a larger absolute value is formed due to the face portion. In this case, when the temperature of the side walls of the annealing device is brought to a temperature higher than the atmospheric temperature, the skirt portion is heated by radiant heat, whereby the skirt portion is maintained to be a higher temperature than the face portion. In more detail, this can be achieved by heating the side walls of the annealing device by a gas burner at the inside of it or from the outside, or by disposing a heater such as a heating wire at the outside of a side wall or side walls of the annealing device.

In the third invention, the glass panel portion is rapidly cooled at a cooling rate of 50° C./min or higher until the temperature range where the glass viscosity is $10^{17}$ poises or higher, whereby a compression stress of 60 kg/cm$^2$ in absolute value or higher is formed in the glass surface. Then, the glass panel portion is put in the annealing device in which the temperature is raised to the temperature range where the glass viscosity is $10^{13.5}$–$10^{15}$ poises whereby the residual stress in the glass is stabilized. In this case, if the temperature is raised to a higher temperature than the temperature range where the glass viscosity is in a range of $10^{13.5}$–$10^{15}$ poises, the residual stress in the glass is reduced or disappears.

The third invention is featurized by stabilizing the residual stress formed before the glass panel portion is put into the annealing device, in which the glass panel portion is forcibly cooled with the cooling air.

For the annealing device used for the present invention, a furnace of several 10 meters long, called an annealing furnace, is preferably used. However, another suitable device may be used as long as it achieves the same function. Atmosphere inside the annealing furnace is temperature-adjusted with a gas burner or the like. The temperature of the annealing furnace at a portion through which glass panels are put is in a range of about 500° C.–540° C. and the temperature at the outlet is near the room temperature.

According to the glass panel portion of the present invention, the difference of thickness between the central portion and the peripheral portion of the face portion is small; the face portion has a uniform wall thickness; the glass is strengthened by the compressive stress layers formed inner and outer surfaces of the face portion, and the face portion has a flat surface while the wall thickness is thin. Namely, at least the face portion of the glass panel portion has the compressive layers each having a stress value and a thickness sufficient to preventing or delaying the development of a crack, wherein the compressive layers are formed by physically strengthening method.

With use of the glass panel, there is obtainable a glass bulb for a cathode ray tube which has a light weight, minimizes the difference of brightness between the central portion and an edge portion of the face portion and has a sufficient strength durable to a shock while assuring flatness in a range of 1.5R–2.0R.

In the present invention, the compressive stress layers are formed by cooling the face portion faster than the skirt portion of the glass panel portion. Accordingly, deformation in the face portion due to the shrinkage and solidification of the skirt portion can be minimized. Accordingly, improvement in accuracy of radius of the inner surface of the face portion is more than double in comparison with that of the conventional face portion. Further, the compressive stress layers are so formed that the stress value of the compressive layer in the outer surface of the face portion is equal to or larger than that of the inner surface. Accordingly, the effect of preventing the deformation of the face portion is further increased.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Preferred embodiments of the present invention will be described in more detail with reference to the drawings.

Figure 1:
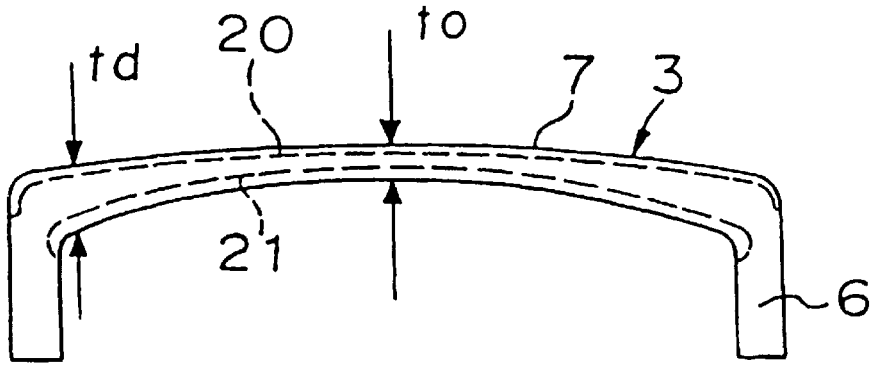
FIG. 1 is a cross-sectional view of an embodiment of the glass panel according to the present invention.

FIG. 1 is a cross-sectional view of an embodiment of the glass panel 3 for a glass bulb for a cathode ray tube. The glass panel is formed so as to be $1.0 \leqq t_d/t_o \leqq 1.2$ where t is the wall thickness of the central portion of a face portion 7 and $t_d$ is the wall thickness of a peripheral portion of the face portion 7. Namely, the glass panel has a uniform wall thickness by determining the ratio of the thicknesses of the central portion to the thickness of the peripheral portion of the face portion to be 1 or a new value. Thus, the light transmittance and the absorptivity coefficient of glass are substantially uniform in the entirety of the face portion, and the difference of brightness between the central portion and the peripheral portion is small, whereby the picture surface can be easily watched.

Figure 2:
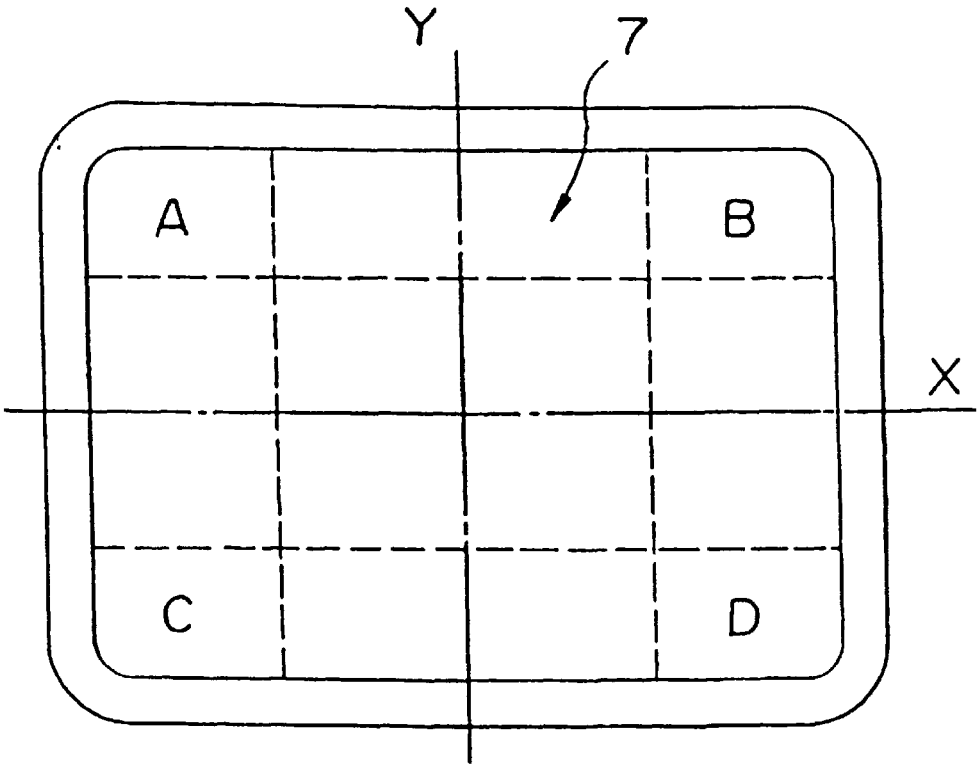
FIG. 2 is a plane view of the glass panel shown in FIG. 1.

FIG. 2 is a plane view of the face portion 7 of the glass panel 3 wherein X and Y indicate respectively central axes in the lateral direction and the longitudinal direction. Dotted lines divide the picture surface of the face portion 7 into 16 sections. Since the radius of curvature of the inner surface of the face portion 7 is smaller than the radius of curvature of the outer surface, the wall thickness of the face portion becomes thicker as the distance from the center of the face portion is larger. Accordingly, the wall thickness at four corner portions of A, B, C and D of the face portion 7 is largest. In the glass panel of the present invention, it is desirable to satisfy the above-mentioned formula $1.0 \leqq t_d/t_o \leqq 1.2$ on diagonal lines including the four corners A, B, C and D.

In this embodiment, compressive stress layers 20, 21 are formed in the outer surface and the inner surface of the effective picture surface portion of the face portion 7 as indicated by dotted lines in FIG. 1. The thickness of the compress stress layers 20, 21 is defined to be $t_o/10$ or more. Further, it is desirable that the stress value $|\sigma_c|$ (absolute value) of the compressive stress layers 20, 21 is 60 kg/cm$^2 \leqq |\sigma_c|$.

The compressive stress layers 20, 21 are formed in the outer and inner surfaces respectively by physically strengthening the glass panel after it has been shaped by press-shaping a molten glass. The physically strengthening is conducted by cooling the glass panel in the annealing furnace. When the temperature of the glass panel is reduced to the room temperature and it reaches a sufficient equilibrium state, the compressive stress layers are formed in the glass surfaces and a tensile stress layer is formed inside the glass, which remain as residual stresses.

The magnitude of the stresses produced in the glass panel depends on a time required when the glass surfaces are reduced from the annealing temperature to the distortion point. As the cooling rate is higher, the difference of shrinkage between the glass surfaces and the inside of it become larger. After the glass panel has been cooled, a large compressive stress $|\sigma_c|$ is produced in each of the glass surfaces. At the same time, however, a large tensile stress of $-\sigma_c/2 \leqq \sigma_t \leqq \sigma_c/4$ naturally results inside the glass panel to cancel the compressive stresses. The signs of the compressive stress layers $\sigma_c$ and the tensile stress $\sigma_t$ are opposite each other. In the present invention, the compress stress layers $\sigma_c$ are determined to have a negative sign and the tensile stress $\sigma_t$ is to have a positive sign. Although the presence of the compressive stress layers in the glass surfaces improves the strength, an excessively large tensile strength produced in the central portion of the inside of the glass panel may cause self-explosion because of a defect in material which has not been molten in or near the central portion of the inside of the glass panel, which tends to release energy by the tensile stress accumulated at the inside.

In consideration of thermal impulse and so on during assembling steps for the ordinary cathode ray tubes, it has been found from thermal impulse tests for glass bulbs that it is necessary to control the tensile stress at the central portion of the inside of the glass panel so as not to exceed 100 kg/cm$^2$ in order to prevent the self-explosion. Accordingly, it is necessary to determine the compressive stress in a range of less than 400 kg/cm$^2$ in absolute value from the relation of $-\sigma_c/2 \leqq \sigma_r \leqq -\sigma_c/4$.

The formation of the compressive stress layers by the physically strengthening method makes the glass panel flat, thin and uniform in thickness, improves visibility, increases the transmittance and provides uniform brightness in the face portion.

Figure 3:
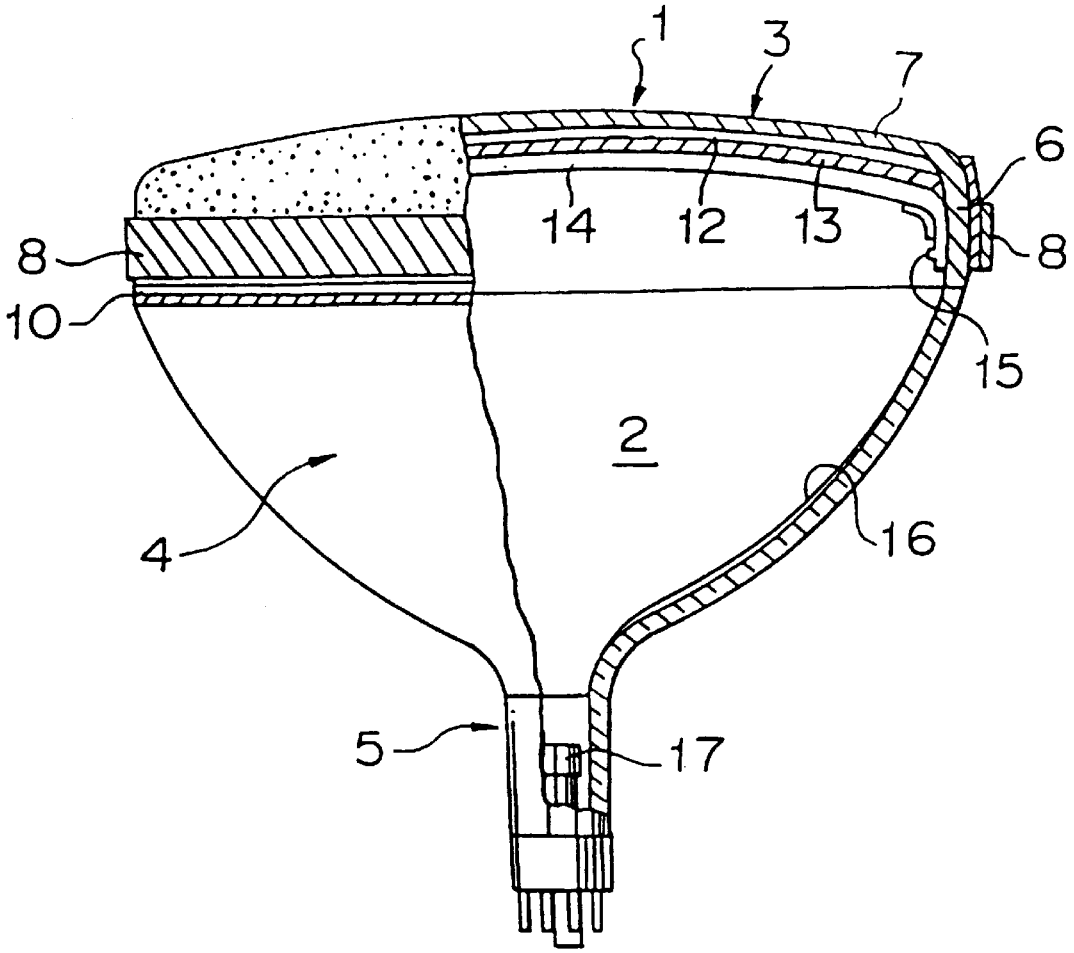
FIG. 3 is a side view partly cross-sectional to a cathode ray tube to which the present invention is applied.

FIG. 3 shows data of 6 kinds of glass panel samples which were prepared by changing conditions of radius of curvature, wall thickness, transmittance and so on of the face portion. The compressive stress values in Table 3 are shown in absolute values.

TABLE 3

| | Sample No. 1 | Sample No. 2 | Sample No. 3 | Sample No. 4 | Sample No. 5 | Sample No. 6 |
|---|---|---|---|---|---|---|
| Radius of curvature of outer surface (mm) | 640 | 1200 | 1200 | 1200 | 1200 | 1200 |
| Radius of curvature of inner surface (mm) | 600 | 1115 | 1115 | 1115 | 1115 | 900 |
| Wall thickness of central portion, $t_o$ (mm) | 10.5 | 10.0 | 10.0 | 10.0 | 10.0 | 10.0 |
| Wall thickness of edge portion of display, $t_d$ (mm) | 12.2 | 11.0 | 11.0 | 11.0 | 21.0 | 14.2 |
| $t_d/t_o$ | 1.16 | 1.10 | 1.10 | 1.10 | 1.10 | 1.42 |
| Transmittance of central portion, $T_o$ (%) | 56.1 | 57.4 | 57.4 | 57.4 | 57.4 | 57.4 |
| Transmittance of edge portion of display, $T_d$ (%) | 51.9 | 54.8 | 54.8 | 54.8 | 54.8 | 47.3 |
| Transmittance ratio, $T_d/T_o$ (%) | 92.4 | 95.4 | 95.4 | 95.4 | 95.4 | 82.3 |
| Weight (kg) | 3.9 | 3.7 | 3.7 | 3.7 | 3.7 | 4.2 |
| Compressive stress of central portion (kg/cm$^2$) | — | — | 43 | 65 | 187 | — |
| Compressive stress of edge portion of display (kg/cm$^2$) | — | — | 40 | 63 | 183 | — |
| Fail (Failure) | 0/20 | 9/20 | 2/20 | 0/20 | 0/20 | 0/20 |

TABLE 4

| | Panel glass | Funnel glass | Neck glass |
|---|---|---|---|
| Title (Tradename) | 5008 | 0138 | 0150 |
| Density (g/cm$^3$) | 2.79 | 3.00 | 3.29 |
| Young's modulus (kg/cm$^2$) | $7.5 \times 10^5$ | $6.9 \times 10^5$ | $6.2 \times 10^5$ |
| Poisson's ratio | 0.21 | 0.21 | 0.23 |
| Softening point (° C.) | 703 | 663 | 643 |
| Annealing point (° C.) | 521 | 491 | 466 |
| Distortion point (° C.) | 477 | 453 | 428 |

TABLE 5

| | Panel glass | Funnel glass | Neck glass |
|---|---|---|---|
| Title (Tradename) | 5008 | 0138 | 0150 |
| $SiO_2$ | 60.5 | 52.0 | 47.5 |
| SrO | 8.0 | — | 2.0 |
| BaO | 9.0 | — | — |
| PbO | — | 22.0 | 32.5 |
| $Al_2O_3$ | 3.0 | 5.0 | 3.5 |
| CaO | 3.0 | 5.0 | — |
| $Na_2O$ | 8.0 | 8.0 | 4.5 |
| $K_2O$ | 8.5 | 8.0 | 10.0 |

Each of sample Nos. 1–6 are glass bulbs used for cathode ray tubes for color TV, which have characteristics shown in Table 4, and are prepared with use of glass material having compositions described in Table 5. The aspect ratio of the face portion of the glass bulbs is 4:3 and these are used for 15 inch -type televisions each of which has an effective picture surface having a diagonal length of 36 cm. These glass bulbs are assembled in cathode ray tubes in accordance with ordinary manufacturing steps.

In Table 3, the data showing percentages of failure in implosion-proof tests were obtained by the method described in the UL safety standards of U.S.A. Namely, the face portion of each of the glass panels is hit with a steel ball at an energy of 7J, and judgment of safety is made depending on an amount of pieces of glass scattering from the face portion. The position of impact is determined to be 31.25 mm on a diagonal line from an end of effective picture surface, which is apt to subject the influence of the wall thickness distribution of the face portion with respect to the implosion-proof characteristics.

SAMPLE 1

No compressive stress layer is formed. The radius of curvatures of the outer surface and the inner surface are small, and it is near a spherical shape in comparison with other samples. Accordingly, it was strong to the impact, and there was no failure in the implosion-proof tests. The wall thickness at the diagonal line and near the edge portion of the display surface could be relatively thin as 12.5 mm.

Further, the light transmittance ratio between the central portion and an edge portion at the diagonal line of the face portion was excellent as 93%. Since the radius of curvature of the outer surface was small as 640 mm, and the visibility was poor and there was difficulty in watching the picture surface.

SAMPLE 2

No compressive stress layer is formed. The radius of curvature of the outer surface was increased to 1200 mm to improve the visibility. The ratio of wall thickness of the central portion of the face portion to the wall thickness of an edge portion of the effective picture surface is 1.10, and the face portion provides excellent uniformity of wall thickness. Further, the wall thickness of the edge portion of the display surface was made thin as 11.0 mm to increase the light transmittance to 95.4%. However, since the wall thickness of the edge portion of the effective picture surface was thin, the strength was poor and failure in the implosion-proof tests was extremely high as about 50% (a failure of 9/20).

SAMPLE 3

The shape of the panels is the same as that of sample 2. The compressive stress layers were formed in the surfaces of the panels by physically strengthening method to thereby improve implosion-proof properties. The glass panels were formed by cooling the face portion of the each of the glass panel portions from the glass softening point to a temperature (380° C.) where the glass viscosity is $10^{17}$ poises or higher at a cooling rate of 100° C./min.; then, putting the glass panel portions in the annealing furnace in which the temperature of the glass panel portions were brought to a temperature (485° C.) where the glass viscosity is $10^{14.5}$ poises; and then, cooling them to the room temperature at a cooling rate of 10° C./min. The compressive stress value was 43 kg/cm$^2$ at the central portion of the face portion and 40 kg/cm$^2$ at the edge portion of the face portion. The compressive stress value is substantially uniformly distributed in the effective display surface of the face portion. The thickness of the compressive stress layers was in a range of 1.5 mm to 1.8 mm, and was more than 1/10 as thick as that of the central portion of the face portion. The compressive stress layers increased the strength to impact and provided good result in the implosion-proof tests in comparison with the sample 2 having the same shape. However, the percentage of the failure was 10%.

SAMPLE 4

The shape of panels is the same as that of Sample 2. The compressive stress value was increased to more than that of Sample 3. The panels were formed by cooling the face portion of each of the glass panel portions in the annealing furnace from a temperature (500° C.) where the glass viscosity was $10^{14}$ poises to a temperature (400° C.) where the glass viscosity was $10^{16}$ poises; and cooling them by supplying a cooling air of about 200° C. at a cooling rate of 40° C./min. The stress value of the compressive stress layers was increased to about 1.5 times as that of Sample 3 so as to be 65 kg/cm$^2$ at the central portion of the face portion and 63 kg/cm$^2$ at the edge portion of the face portion, so that the implosion-proof properties were increased. As a result, the percentage of success in the implosion-proof tests was 100%, and no failure took place.

SAMPLE 5

The shape of panels is the same as that of Sample 2. The compressive stress value was increased to be more than that of Sample 3. The panels were formed by cooling the face portion of each of the glass panel portions from the glass softening point to a temperature (380° C.) where the glass viscosity was $10^{17}$ poises or higher at a cooling rate of 100° C./min; putting the glass panel portions in the annealing furnace in which the temperature of the glass panel portions was brought to a temperature (440° C.) where the glass viscosity was $10^{15.5}$ poises; and cooling them to the room temperature at a cooling rate of 10° C./min. The stress value of the compressive stress layers was further increased than that of Sample 4 so as to be 187 kg/cm$^2$ at the central portion of the face portion and 183 kg/cm$^2$ at the edge portion of the face portion. As a result, the percentage of success in the implosion-proof tests was 100% and no failure took place.

SAMPLE 6

The strength of the face portions was increased without forming the compressive stress layers, and the percentage of success of the implosion-proof tests was 100%. However, this sample has a small radius of curvature of the inner surface whereby the wall thickness of edge portions of the face portion is increased and the weight is also increased (4.2 kg). Accordingly, handling of the products is inconvenient. Further, the difference of wall thickness between the central portion and edge portions is large, whereby difference in transmittance at these portions is large and the visibility is poor.

In the present invention, the glass panel constituting a cathode ray tube is press-shaped with a pressing mold and is cooled while it is passed through an annealing furnace. In the cooling step, the glass panel is solidified and compressive stress layers are formed in the surfaces of the glass panel. For instance, by applying a cooling air mainly from the outer side of the front of the face portion whereby the face portion is cooled faster than the skirt portion. Thus, the magnitude of the compressive stress in the face portion is larger than that of the skirt portion, and at the same time, the magnitude of the compressive stress in the outer surface of the face portion is larger than that of the inner surface.

Figure 4:
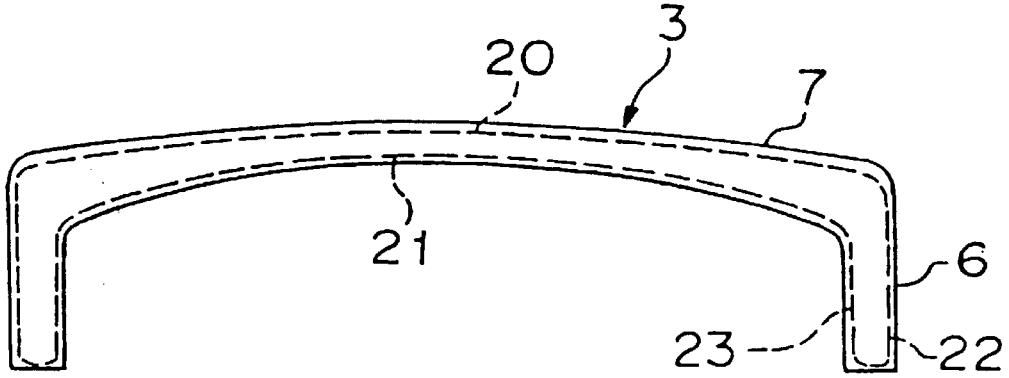
FIG. 4 is a cross-sectional view of an other embodiment of the glass panel according to the present invention.

FIG. 4 is a cross-sectional view of another embodiment of the glass panel 3 for a cathode ray tube according to the present invention. Dotted lines 20, 21 respectively show compressive stress layers formed in outer and inner surfaces of the face portion 7. Also, compressive stress layers 22, 23 are formed in outer and inner surfaces of the skirt portion 6. Among these compressive stress layers 20–23, at least the compressive stress layers 20, 21 of the face portion 7 has more than 1/10 times as large as the thickness of the central portion of the face portion, and the stress values of the compressive stress layers 20, 21 of the face portion 7 are larger than the stress values of the compressive stress layers 22, 23 of the skirt portion 6.

With respect to the compressive stress layers 20, 21 of the face portion 7, it is desirable that the stress value of the outer stress layer 20 is larger than the stress value of the inner stress layer 21. In order that the stress value of the face portion is made larger than the stress value of the skirt portion and the stress value of the outer stress layer of the face portion is larger than that of the inner stress layer, the annealing furnace used after the press-shaping of the glass panel should be so constructed that a cooling air be supplied from the lower side of the transferring passage, and the glass panel is put on the transferring passage with the face portion directing downwardly while the glass panel is passed through the annealing furnace. Then, cooling function is most effective to the outer surface of the face portion, and next, the inner surface of the face portion, and next, the skirt portion. Thus, by physically strengthening the glass panel with a difference of cooling rate to portions of the glass panel, effect of preventing the deformation after the cooling and solidifying of the glass panel is remarkably improved as shown by the sample described thereafter.

Table 6 shows concrete examples of glass panels having the construction describe above. In Table 6, there are shown the compressive stress values (absolute value) at portions in the outer and inner surfaces of the face portion and the skirt portion of the glass panel with respect to four kinds of sample (having an aspect ratio of 4:3).

TABLE 6

| Compressive stress formed in panel surface (kg/cm$^2$) | | | | | |
|---|---|---|---|---|---|
| | | Sample No. 7 | Sample No. 8 | Sample No. 9 | Sample No. 10 |
| Outer surface | Central portion of face portion | 121 | 115 | 89 | 123 |
| | Edge postion of display surfure of face portion (long axis) | 123 | 102 | 82 | 107 |
| | Edge portion of display surface of face portion (short axis) | 126 | 101 | 84 | 112 |
| | Skirt portion (long axis) | 241 | 64 | 52 | 72 |
| | Skirt portion (short axis) | 228 | 71 | 54 | 81 |
| Inner surface | Central portion of face portion | 117 | 136 | 96 | 101 |
| | Edge portion of display surface of face portion (long axis) | 118 | 117 | 89 | 93 |
| | Edge portion of display surface of face portion (short axis) | 120 | 113 | 87 | 95 |
| | Skirt portion (long axis) | 238 | 73 | 56 | 62 |
| | Skirt portion (short axis) | 215 | 77 | 59 | 61 |

Sample 7 was subjected to a physically strengthening method wherein the glass panel was put on the transferring passage with its skirt portion directing downwardly in the annealing furnace in which the cooling air is supplied from the lower side of the transferring passage in the same manner as before-mentioned examples and the cooling rate to the skirt portion was increased. Samples 8 through 10 were subjected to a physically strengthening method wherein glass panels were put on the transferring passage with their face portions directing downwardly and the cooling rate to the face portion was increased.

Samples 8 and 9 were formed in the same manner as Sample 5. Sample 8 was heated to a temperature of 450° C. and Sample 9 was heated to a temperature of 470° C. Then, both Samples 8 and 9 were cooled to the room temperature at a cooling rate of 10° C./min. When they are heated to the temperature described above in the annealing furnace, the temperature of each of the skirt portions was maintained to be 5° C.–20° C. higher than the temperature of each of the face portions. In this case, gas burners are provided at inner side walls of the annealing furnace to heat the skirt portions.

Sample 10 was formed in the same manner as Sample 4 wherein it was cooled with a cooling air of 150° C. at a cooling rate of 60° C./min.

As clear from Table 6, Sample 7 shows that the stress value of the skirt portion is larger than the stress value of the face portion in either the outer surface or the inner surface. On the other hand, Samples 8 through 10 show that the stress value of the face portion is larger than the stress value of the skirt portion in either the outer surface or the inner surface. With respect to the Samples 8 through 10, the stress value of the inner surface of the face portion is larger than the stress value of the outer surface in Samples 8 and 9. In the other than, in Sample 10, the stress value of the outer surface is larger than the stress value of the inner surface.

Table 7 shows the result of tests concerning the twisting deformation after the cooling and solidification of each of the samples in Table 6, which have been subjected to physically strengthening.

TABLE 7

| Component of twisting in curvature inner surface ($\mu$m) | | | | |
|---|---|---|---|---|
| | Sample No. 7 | Sample No. 8 | Sample No. 9 | Sample No. 10 |
| Number of sampling | 100 | 100 | 100 | 100 |
| Avenge value | 105 | −25 | −22 | −13 |
| Standard deviation tests | 81 | 35 | 41 | 26 |

The data of Table 7 were obtained by measuring the average values and standard deviations of twisting by sampling each 100 of Samples 7 through 10. The measurement of twisting was conducted by measuring the difference in height from the face surface at the central portion of the panel with respect to two diagonal lines connecting four edge portions of the skirt portion of the glass panel. Signs indicate the directions of twisting. The magnitude of the twisting is shown in absolute value. As the absolute value is larger, the degree of the twisting deformation is large.

As understood from Table 7, the degree of twisting of Sample 7 is largest, and the scattering in distribution of twisting is also large. As understood from the comparison of Sample 8 with Sample 9, when the compressive stress value of the inner surface of the face portion is higher than the compressive stress value of the outer surface, one having a higher compressive stress shows a smaller scattering, however, the degree of twisting becomes larger. On the other hand, when the physically strengthening is so conducted as in Sample 10 that the stress value of the face portion is larger than the stress value of the skirt portion and the stress value of the outer surface of the face portion is larger than the stress value of the inner surface, the degree of twisting deformation is smallest and also scattering is small. Accordingly, a stable result is obtainable.

As described above, in the glass bulb for a cathode ray tube according to the present invention, compressive stress layers having a predetermined thickness and a predetermined strength are formed in the surfaces of the glass panel face portion by physically strengthening. Accordingly, the strength of the panel face portion is increased, development of crack due to a shock is prevented or delayed, and occurrence of implosion is controlled.

Further, a sufficient strength can be maintained; the flatness of the face portion is improved to thereby suppress difference in brightness in the display surface. Further, visibility can be improved and the wall thickness of the glass portion can be reduced with the result of reducing the weight.

In the present invention, the compressive stress of the face portion of the glass panel is larger than the compressive stress of the skirt portion, and the compressive stress value of the outer surface of the face portion is larger than (or equal to) the compressive stress value of the inner surface of the face portion. Accordingly, the deformation of glass such as twisting can be surely prevented. Accordingly, when the glass bulb of the present invention is used for a Braun tube for color TV, scanning of electron beams can be achieved with high accuracy, and the quality of picture image can be improved.

Obviously, numerous modifications and variations of the present invention are possible in light of the above teachings. It is therefore to be understood that within the scope of the appended claims, the invention may be practiced otherwise than as specifically described herein.

What is claimed is:

1. A glass bulb for a cathode ray tube which comprises:

a glass panel portion having a substantially rectangular *flat* face portion constituting a picture displaying surface and a skirt portion contiguous to the circumferential portion of the face portion and extending therefrom in substantially perpendicular to the face portion, a funnel portion in a funnel-like form which is airtightly connected to the glass panel portion, and a neck portion disposed at the root of the funnel portion and containing therein an electron gun, wherein compressive stress layers each having a thickness of $t_o/10$ or more are formed in the outer surface and the inner surface of the face portion where $t_o$ is the wall thickness at the central portion of the effective picture surface portion of the face portion of the glass panel portion, *the radius of curvature of the inner portion of the face portion is smaller than the radius of the curvature of the outer surface*.

2. The glass bulb for a cathode ray tube according to claim 1, wherein the glass wall thickness $t_d$ near an edge portion of the face portion and on a diagonal line of the face portion is in a relation of $1.0 \leqq t_d/t_o \leqq 1.2$.

3. The glass bulb for a cathode ray tube according to claim 1, wherein $60\ kg/cm^2 \leqq |\sigma_c|$ where $\sigma_c$ is the stress value of the compressive stress layers in a region including the diagonal line of the effective picture surface portion of the face portion.

4. The glass bulb for a cathode ray tube according to claim 2, wherein the radius of curvature $R_G$ of the outer surface of the face portion is 1.5 R or more when $R = 42.5 \times V/25.4 + 45.0$ (mm) and V is the length of a diagonal line of the effective displaying surface.

5. The glass bulb for a cathode ray tube according to claim 2, wherein the compressive stress layers in the outer and inner surfaces of the face portion are substantially uniformly formed in the entire of the face portion.

6. The glass bulb for a cathode ray tube according to claim 1, wherein the compressive stress layers are extended to the skirt portion of the glass panel portion.

7. The glass bulb for a cathode ray tube according to claim 6, wherein the stress value of the compressive stress layers of the face portion is larger than that of the skirt portion.

8. The glass bulb for a cathode ray tube according to claim 7, wherein the stress value of the compressive stress layer in the outer surface of the face portion is equal to or larger than that of the inner surface.

*9. A glass bulb for a cathode ray tube which comprises:*

*a glass panel portion having a substantially rectangular, flat face portion constituting a picture displaying surface and a skirt portion contiguous to the circumferential portion of the face portion and extending therefrom substantially perpendicular to the face portion,*

*a funnel portion in a funnel-like form which is airtightly connected to the glass panel portion, and*

*a neck portion disposed at the root of the funnel portion and containing therein an electron gun, wherein compressive stress layers each having a thickness of $t_o/10$ or more are substantially uniformly formed in the outer surface and the inner surface of the entire face portion where $t_o$ is the wall thickness at the central portion of the effective picture surface portion of the face portion of the glass portion, the radius of curvature of the inner portion of the face portion is smaller than the radius of curvature of the outer surface.*

*10. A glass bulb for a cathode ray tube which comprises:*

*a glass panel portion having a substantially rectangular, flat face portion constituting a picture displaying surface wherein the radius of curvature of the inner portion of the face portion is smaller than the radius of curvature of the outer surface and a skirt portion contiguous to the circumferential portion of the face portion and extending therefrom substantially perpendicular to the face portion,*

*a funnel portion in a funnel-like form which is airtightly connected to the glass panel portion, and*

*a neck portion disposed at the root of the funnel portion and containing therein an electron gun, wherein compressive stress layers each having a thickness of $t_o/10$ or more are formed in the outer surface and the inner surface of the face portion where $t_o$ is the wall thickness at the central portion of the effective picture surface portion of the face portion of the glass panel portion and wherein the compressive stress layers extend to the skirt portion of the glass panel portion.*

*11. A glass bulb for a cathode ray tube which comprises:*

*a glass panel portion having a substantially rectangular, flat face portion constituting a picture displaying surface and a skirt portion contiguous to the circumferential portion of the face portion and extending therefrom substantially perpendicular to the face portion,*

*a funnel portion in a funnel-like form which is airtightly connected to the glass panel portion, and*

*a neck portion disposed at the root of the funnel portion and containing therein an electron gun, wherein compressive stress layers each having a thickness of $t_o/10$ or more are substantially uniformly formed in the outer surface and the inner surface of the entire face portion where $t_o$ is the wall thickness at the central portion of the effective picture surface portion of the face portion of the glass panel portion.*

*12. A glass bulb for a cathode ray tube which comprises:*

*a glass panel portion having a substantially rectangular, flat face portion constituting a picture displaying surface wherein the radius of curvature of the inner portion of the face portion is smaller than the radius of curvature of the outer surface and a skirt portion contiguous to the circumferential portion of the face portion and extending therefrom substantially perpendicular to the face portion,*

*a funnel portion in a funnel-like form which is airtightly connected to the glass panel portion, and*

*a neck portion disposed at the root of the funnel portion and containing therein an electron gun, wherein compressive stress layers each having a thickness of $t_o/10$ or more are formed in the outer surface and the inner surface of the face portion where $t_o$ is the wall thickness at the central portion of the effective picture surface portion of the face portion of the glass panel portion and wherein the compressive stress layers extend to the skirt portion of the glass panel portion.*

13. A glass bulb for a cathode ray tube which comprises:

a glass panel portion having a substantially rectangular, flat face portion constituting a picture displaying surface and a skirt portion contiguous to the circumferential portion of the face portion and extending therefrom substantially perpendicular to the face portion, a funnel portion in a funnel-like form which is airtightly connected to the glass panel portion, and a neck portion disposed at the root of the funnel portion and containing therein an electron gun, wherein compressive layers each having a thickness of $t_o/10$ or more are formed in the outer surface and the inner surface of the face portion where $t_o$ is the wall thickness at the central portion of the effective picture surface portion of the face portion of the glass panel portion, the radius of curvature of the inner portion of the face portion is smaller than the radius of curvature of the outer surface and wherein the glass wall thickness $t_d$ near an edge portion of the face portion and on a diagonal line of the face portion is in a relation of $1.0 \leqq t_d/t_o \leqq 1.2$.

14. A glass bulb for a cathode ray tube which comprises:

a glass panel portion having a substantially rectangular, face portion constituting a picture displaying surface and a skirt portion contiguous to the circumferential portion of the face portion and extending therefrom substantially perpendicular to the face portion, a funnel portion in a funnel-like form which is airtightly connected to the glass panel portion, and a neck portion disposed at the root of the funnel portion and containing therein an electron gun, wherein compressive stress layers each having a thickness of $t_o/10$ or more are formed in the outer surface and the inner surface of the face portion where $t_o$ is the wall thickness at the central portion of the effective picture surface portion of the face portion of the glass panel portion, wherein the radius of curvature $R_G$ of the outer surface of the face portion is 1.5 R or more where $R=42.5\times V/25.4+40.5$ (mm and V is the length of a diagonal line of the effective displaying surface.

15. A glass bulb for a cathode ray tube which comprises:

a glass panel portion having a substantially rectangular, face portion constituting a picture displaying surface and a skirt portion contiguous to the circumferential portion of the face portion and extending therefrom substantially perpendicular to the face portion, a funnel portion in a funnel-like form which is airtightly connected to the glass panel portion, and a neck portion disposed at the root of the funnel portion and containing therein an electron gun, wherein compressive stress layers each having a thickness of $t_o/10$ or more are formed in the outer surface and the inner surface of the face portion where $t_o$ is the wall thickness at the central portion of the effective picture surface portion of the face portion of the glass panel portion and wherein the compressive stress layers extend to the skirt portion of the glass panel portion and the stress values of the compressive stress layers of the face portion is larger than that of the skirt portion.

16. The glass bulb for a cathode ray tube according to claim 15, wherein the radius of curvature of the inner portion of the face portion is smaller than the radius of curvature of the outer surface.

17. The glass bulb for a cathode ray tube according to claim 16, wherein the glass wall thickness $t_d$ near and edge portion of the face portion and on a diagonal line of the face portion is in a relation to $1.0 \leqq t_d/t_o \leqq 1.2$.

18. The glass bulb for a cathode ray tube according to claim 15, wherein 60 $kg/cm^2 \leqq /\sigma_c/$ where $\sigma_c$ is the stress value of the compressive stress layers in a region including the diagonal line of the effective picture surface portion of the face portion.

19. The glass bulb for a cathode ray tube according to claim 15, wherein the radius of curvature $R_G$ of the outer surface of the face portion is 1.5 R or more where $R=42.5\times V/25.4+45.0$ (mm) and V is the length of a diagonal line of the effective displaying surface.

20. The glass bulb for a cathode ray tube according to claim 15, wherein the compressive stress layers in the outer and inner surfaces of the face portion are substantially uniformly formed in the entire of the face portion.

21. The glass bulb for a cathode ray tube according to claim 15, wherein the stress value of the compressive stress layer in the outer face of the face portion is equal to or larger than that of the inner surface.

22. A glass bulb for a cathode ray tube which comprises:

a glass panel portion having a substantially rectangular, flat face portion constituting a picture displaying surface and a skirt portion contiguous to the circumferential portion of the face portion and extending therefrom in substantially perpendicular to the face portion, a funnel portion in a funnel-like form which is airtightly connected to the glass panel portion, and a neck portion disposed at the root of the funnel portion and containing therein an electron gun, wherein compressive stress layers each having a thickness of $t_o/10$ or more are formed in the outer surface and the inner surface of the face portion where $t_o$ is the wall thickness at the central portion of the effective picture surface portion of the face portion of the glass panel portion, where (1) the stress, $\sigma_c$, is 60 $kg/cm^2 \leqq /\sigma_c/$ in the compressive stress layers in a region including the diagonal line of the effective picture surface portion of the face portion, (2) the compressive stress layers extend to the skirt portion of the glass panel portion (3) the radius of the curvature of the inner portion of the face portion is smaller than the radius of the curvature of the outer surface, (4) the radius of curvature $R_G$ of the outer surface of the face portion is 1.5 R or more where $R=42.5\times V/25.4+45.0$ (mm) and V is the length of a diagonal line of the effective displaying surface and (5) the glass wall thickness $t_d$ near an edge portion of the face portion and on a diagonal line of the face portion is in a relation of $1.0 \leqq t_d/t_o \leqq 1.2$.

23. The glass bulb for a cathode ray tube according to claim 22, wherein the compressive stress layers in the outer and inner surfaces of the face portion are substantially uniformly formed in the entire of the face portion.

24. The glass bulb for a cathode ray tube according to claim 22, wherein the stress value of the compressive stress layer in the outer surface of the face portion is equal to or larger than that of the inner surface of the face portion.

* * * * *